United States Patent
Shin (10) Patent No.: US 10,356,352 B2
(45) Date of Patent: Jul. 16, 2019

(54) DIFFERENTIAL CIRCUIT AND IMAGE SENSING DEVICE INCLUDING THE SAME

(71) Applicant: SK hynix Inc., Gyeonggi-do (KR)

(72) Inventor: Min-Seok Shin, Gyeonggi-do (KR)

(73) Assignee: SK hynix Inc., Gyeonggi-do (KR)

( * ) Notice: Subject to any disclaimer, the term of this patent is extended or adjusted under 35 U.S.C. 154(b) by 336 days.

(21) Appl. No.: 14/883,246

(22) Filed: Oct. 14, 2015

(65) Prior Publication Data

US 2016/0353033 A1 Dec. 1, 2016

(30) Foreign Application Priority Data

May 26, 2015 (KR) .................. 10-2015-0072949

(51) Int. Cl.
*H04N 5/378* (2011.01)

(52) U.S. Cl.
CPC .................. *H04N 5/378* (2013.01)

(58) Field of Classification Search
CPC .... H04N 5/378; H04N 5/3355; H04N 5/3745; H04N 5/37452; H04N 5/37455
USPC ........................................... 348/304
See application file for complete search history.

(56) References Cited

U.S. PATENT DOCUMENTS

| 6,606,122 B1* | 8/2003 | Shaw ............... H01L 27/14603 250/208.1 |
| 2002/0093861 A1* | 7/2002 | Huffman ................ G11C 29/38 365/201 |
| 2009/0128653 A1* | 5/2009 | Tanaka .................. H04N 5/365 348/222.1 |
| 2009/0262229 A1* | 10/2009 | Lim ........................ G11C 7/16 348/311 |
| 2009/0295955 A1* | 12/2009 | Shimano .............. H04N 5/3577 348/294 |
| 2015/0138411 A1* | 5/2015 | Nakamura ............. H03K 5/249 348/300 |

FOREIGN PATENT DOCUMENTS

KR  1020090111029  10/2009

* cited by examiner

*Primary Examiner* — Sinh Tran
*Assistant Examiner* — Zhenzhen Wu
(74) *Attorney, Agent, or Firm* — IP & T Group LLP (57) ABSTRACT

A differential circuit includes a differential selection block suitable for generating differential selection signals corresponding to differential input signals in response to an enable signal and a differential loading block suitable for loading differential output signals corresponding to the differential input signals on differential lines in response to the differential selection signals.

20 Claims, 6 Drawing Sheets

DIFFERENTIAL CIRCUIT AND IMAGE SENSING DEVICE INCLUDING THE SAME

CROSS-REFERENCE TO RELATED APPLICATIONS

The present application claims priority of Korean Patent Application No 10-2015-0072949, filed on May 26, 2015, which is incorporated herein by reference in its entirety.

BACKGROUND

1. Field

Exemplary embodiments of the present invention relate to a semiconductor design technology, and more particularly, to a differential circuit and an image sensing device including the differential circuit.

2. Description of the Related Art

Image sensing devices capture images using the photosensitive properties of semiconductors. Image sensing devices are classified into charge coupled device (CCD) image sensors and complementary metal oxide semiconductor (CMOS) image sensors. The CMOS image sensing devices have come into widespread use. This is because analog circuits and digital control circuits of CMOS image sensing devices can be realized on a single integrated circuit (IC).

SUMMARY

Exemplary embodiments of the present invention are directed to a differential circuit that produces a differential signal with an improved voltage swing margin and an image sensing device including the differential circuit.

In accordance with an embodiment of the present invention, a differential circuit may include: a differential selection block suitable for generating differential selection signals corresponding to differential input signals in response to an enable signal; and a differential loading block suitable for loading differential output signals corresponding to the differential input signals on differential lines in response to the differential selection signals.

The differential selection block may include a first selection unit suitable for generating a first selection signal among the differential selection signals in response to the enable signal and a first input signal among the differential input signals; and a second selection unit suitable for generating a second selection signal among the differential selection signals in response to the enable signal and a second input signal among the differential input signals.

The first selection unit may generate the first selection signal having a voltage level corresponding to a voltage level of the first input signal or fixed with a predetermined voltage level regardless of the voltage level of the first input signal in response to the enable signal.

The second selection unit may generate the second selection signal having a voltage level corresponding to a voltage level of the second input signal or fixed with a predetermined voltage level regardless of the voltage level of the second input signal in response to the enable signal.

The differential loading block may include: a first loading unit suitable for loading a first output signal among the differential output signals on a first line among the differential lines in response to the first selection signal among the differential selection signals; and a second loading unit suitable for loading a second output signal among the differential output signals on a second line among the differential lines in response to the second selection signal among the differential selection signals.

The first loading unit may selectively output the first output signal having a predetermined voltage level to the first line in response to the first selection signal.

The second loading unit may selectively output the second output signal having a predetermined voltage level to the second line in response to the second selection signal.

The differential circuit may further include: a precharge block suitable for precharging the differential lines to a high voltage level and wherein the differential loading block may sink one of the differential lines to a low voltage level.

In accordance with another embodiment of the present invention, a differential circuit may include: a first transmission transistor suitable for transmitting a first latch signal among differential latch signals to a first output node in response to an enable signal; a first fixed transistor suitable for fixing the first output node with a low voltage level in response to the enable signal; a first sinking transistor suitable for sinking a first line precharged with a high voltage among differential lines to the low voltage level in response to a first selection signal generated through the first output node among differential selection signals; a second transmission transistor suitable for transmitting a second latch signal among the differential latch signals to a second output node in response to the enable signal; a second fixed transistor suitable for fixing the second output node with the low voltage level in response to the enable signal; and a second sinking transistor suitable for sinking a second line among the differential lines to the low voltage level in response to a second selection signal generated through the second output node among the differential selection signals.

In accordance with another embodiment of the present invention, an image sensing device may include: a plurality of decoding blocks suitable for sequentially generating a plurality of enable signals in response to a column address signal; a plurality of latch blocks suitable for latching a plurality of pixel signals and outputting a plurality of differential latch signals; a plurality of first selection blocks suitable for sequentially generating a plurality of first selection signals among a plurality of differential selection signals in response to the enable signals and a plurality of first latch signals among the differential latch signals; a plurality of second selection blocks suitable for sequentially generating a plurality of second selection signals among the differential selection signals in response to the enable signals and a plurality of second latch signals among the differentia latch signals; a plurality of first loading blocks suitable for sequentially loading a plurality of first output signals among a plurality of differential output signals corresponding to the differential latch signals on a first common line among differential common lines in response to the first selection signals; and a plurality of second loading blocks suitable for sequentially loading a plurality of second output signals among the differential output signals on a second common line among the differential common lines in response to the second selection signals.

An activated first selection block among the first selection blocks may generate a corresponding first selection signal among the first selection signals based on a voltage level of a corresponding first latch signal among the first latch signals, and a deactivated first selection block among the first selection blocks may fix the other first selection signal among the first selection signals with a predetermined voltage level regardless of a voltage level of the other first latch signal among the first latch signals, and an activated second selection block among the second selection blocks may generate a corresponding second selection signal among the second selection signals based on a voltage level of a corresponding second latch signal among the second latch signals, and a deactivated second selection block among the second selection blocks may fix the other second selection signal among the second selection signals with a predetermined voltage level regardless of a voltage level of the other second latch signal among the second latch signals.

A selected first loading block among the first loading blocks may output a corresponding first output signal among the first output signals to the first common line based on a voltage level of the first selection signal, and a non-selected first loading block among the first loading blocks may be deactivated in response to the other first selection signal, and a selected second loading block among the second loading blocks may output a corresponding second output signal among the second output signals to the second common line based on a voltage level of the second selection signal, and a non-selected second loading block among the second loading blocks may be deactivated in response to the other second selection signal.

The image sensing device may further include: a precharge block suitable for precharging the differential common lines to a high voltage level, and wherein one of the selected first loading block and the selected second loading block may sink one among the differential common lines to a low voltage level.

Each of the first selection blocks may include: a first transmission transistor suitable for transmitting the first latch signal to a first output node in response to the enable signal; and a first fixed transistor suitable for fixing the first output node with a low voltage level in response to the enable signal.

Each of the first loading blocks may include a sinking transistor for sinking the first common line to the low voltage level in response to the first selection signal generated through the first output node.

Each of the second selection blocks may include: a second transmission transistor suitable for transmitting the second latch signal to a second output node in response to the enable signal; and a second fixed transistor suitable for fixing the second output node with a low voltage level in response to the enable signal.

Each of the second loading blocks may include a second sinking transistor for sinking the second common line to the low voltage level in response to the second selection signal generated through the second output node.

The image sensing device may further include a pixel region suitable for generating the pixel signals; and a read-out peripheral region suitable for outputting the differential output signals sequentially transmitted through the differential common lines as a plurality of single output signals.

The read-out peripheral region may include: an amplification control block suitable for generating a judge clock signal by delaying a clock signal by a predetermined delay time and generating a precharge signal that purses every predetermined edge of the judge clock signal, and an amplification block suitable for sequentially generating the single output signals by sequentially amplifying the differential output signals in response to the judge clock signal and the precharge signal.

The amplification block may include: a precharge unit suitable for cyclically precharging the differential common lines with a high voltage in response to the precharge signal; and an amplification unit suitable for sequentially amplifying the differential output signals sequentially loaded on the differential common lines in response to the judge clock signal.

DETAILED DESCRIPTION

Exemplary embodiments of the present invention are described below in more detail with reference to the accompanying drawings. These embodiments are provided so that this disclosure is thorough and complete, and fully conveys the scope of the present invention to those skilled in the art. All "embodiments" referred to in this disclosure refer to embodiments of the inventive concept disclosed herein. The embodiments presented are merely examples and are not intended to limit the inventive concept.

The terminology used herein is for describing particular embodiments only and is not intended to be limiting of the inventive concept. As used herein, the singular forms "a", "an" and "the" are intended to include the plural forms as well, unless the context clearly indicates otherwise. It will be further understood that the terms "comprises" and/or "comprising," when used in this specification, indicate the presence of stated features, but do not preclude the presence or addition of one or more other features. As used herein, the term "and/or" indicates any and all combinations of one or more of the associated listed items.

Figure 1:
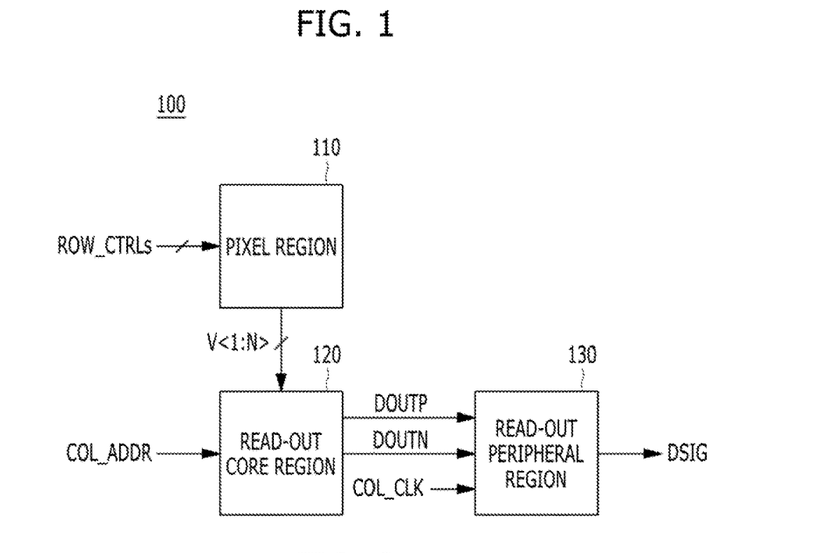
FIG. 1 is a block diagram illustrating an image sensing device according to a comparative example.

FIG. 1 is a block diagram illustrating an mage sensing device according to a comparative example.

Referring to FIG. 1, an image sensing device 100 includes a pixel region 110, a read-out core region 120, and a read-out peripheral region 130.

The pixel region 110 includes a pixel array where a plurality of pixels are arranged in a row and a column direction (not shown). The pixel region 110 generates first to $N^{th}$ pixel signals V<1:N> in units of rows in response to operation control signals ROW_CTRLs.

The read-out core region 120 reads out and sequentially output the first to $N^{th}$ pixel signals V<1:N> by columns as differential output signals DOUTP and DOUTN in response to a column address signal COL_ADDR.

The read-out peripheral region 130 outputs the differential output signals DOUTP and DOUTN as a single output signal DSIG response to a clock signal COL_CLK.

Figure 2:
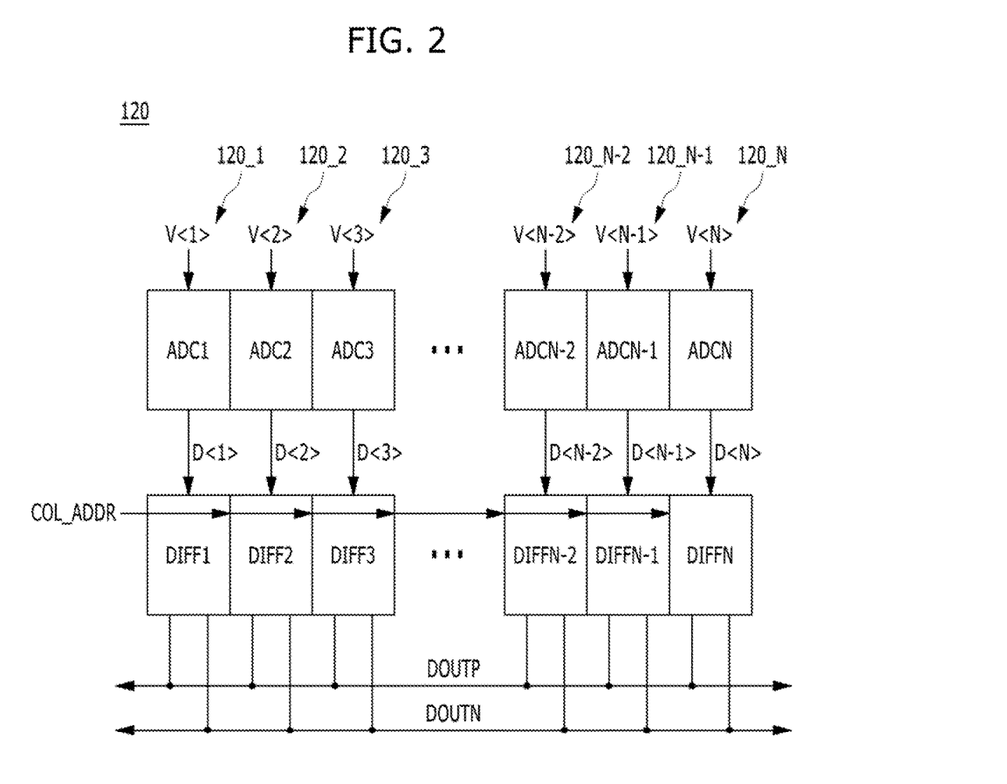
FIG. 2 is a circuit diagram illustrating read-out core region shown in FIG. 1.

FIG. 2 is a circuit diagram illustrating the read-out core region 120 described with reference to FIG. 1.

Referring to FIG. 2, the read-out core region 120 includes first to $N^{th}$ read-out blocks 120_1 to 120_N corresponding to the first to $N^{th}$ pixel signals V<1:N>. Since the first to $N^{th}$ read-out blocks 120_1 to 120_N have the same structure, the first read-out block 120_1 is representatively described.

The first read-out block 120_1 includes a first analog o-digital conversion circuit ADC1 and a first differential circuit DIFF1.

The first analog-to-digital conversion circuit ADC1 converts the first pixel signal V<1>, which is an analog signal, into a digital signal D<1>. For example, although not illustrated, the first analog-to-digital conversion circuit ADC1 detects a voltage level of the first pixel signal V<1> on a basis of a ramp voltage which changes by a predetermined voltage level, and generates the digital signal D<1> corresponding to the detection result.

The first differential circuit DIFF1 outputs the differential output signals DOUTP and DOUTN corresponding to the first digital signal D<1> to differential common lines in response to the column address signal COL_ADDR.

Figure 3:
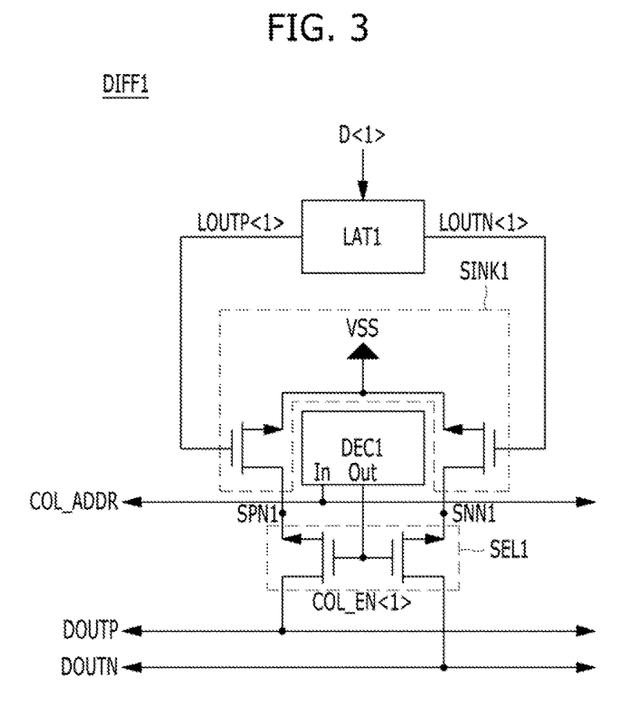
FIG. 3 is a circuit diagram illustrating a first differential circuit shown in FIG. 2.

FIG. 3 is a circuit diagram illustrating the first differential circuit DIFF1 described with reference to FIG. 2.

Referring to FIG. 3 the first differential circuit DIFF1 includes a first decoding block DEC1, a first latch block LAT1, a first differential loading block SINK1 and a first differential selection block SEL1.

The first decoding block DEC1 generates a first enable signal COL_EN<1> in response to the column address sign COL_ADDR, For example, the first decoding block DEC1 decodes the column address signal COL_ADDR and enables or disables the first enable signal COL_EN<1> based on the decoding result.

The first latch block LAT1 latches the first digital signal D<1> corresponding to the first pixel signal V<1> and outputs first differential latch signals LOUTP<1> and LOUTN<1> corresponding to the first digital signal D<1>. For example, the first latch block LAT1 outputs a non-inverted signal of the first digital signal D<1> as the first latch signal LOUTP<1> and outputs an inverted signal of the first digital signal D<1> as the first inverted latch signal LOUTN<1>.

The first differential loading block SINK1 includes a first sinking transistor for sinking a first sink node SPN1 to a low voltage VSS level in response to the first latch signal LOUTP<1>, and a second sinking transistor for sinking a first inverted sink node SNN1 to the low voltage VSS level in response to the first inverted latch signal LOUTN<1>. When the first latch signal LOUTP<1> is of a logic high level and the first inverted latch signal LOUTN<1> is of a logic low level, the first differential loading block SINK1 sinks the first sink node SPN1 to the low voltage VSS level by electrically coupling the first sink node SPN1 with the low voltage VSS terminal and electrically decouples the first inverted sink node SNN1 from a low voltage VSS terminal. When the first latch signal LOUTP<1> is of a logic, law level and the first inverted latch signal LOUTN<1> is of a logic high level, the first differential loading block SINK1 electrically decouples the first sink node SPN1 from the low voltage VSS terminal and sinks the first inverted sink node SNN1 to the low voltage VSS level by electrically coupling the first inverted sink node SNN1 with the low voltage VSS terminal.

The first differential selection block SEL1 includes a first coupling transistor for coupling a non-inverted common line among the differential common lines with the first sink node SPN1 in response to the first enable signal COL_EN<1> and a second coupling transistor for coupling an inverted common line among the differential common lines with the first inverted sink node SNN1 in response to the first enable signal COL_EN<1>. When the first enable signal COL_EN<1> is enabled, the first differential selection block SEL1 couples the noninverted common line with the first sink node SPN1, and simultaneously couples the inverted common line with the first inverted sink node SNN1. When the first enable signal COL_EN<1> is disabled, the first differential selection block SEL1 electrically decouples the non inverted common line from the first sink node SPN1 and simultaneously decouples the inverted common line from the first inverted sink node SNN1.

Figure 4:
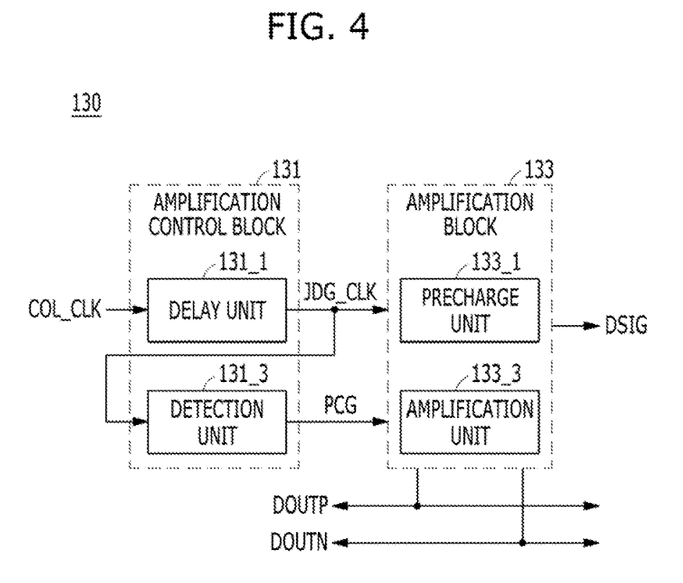
FIG. 4 is a block diagram illustrating a read-out peripheral region shown in FIG. 1.

FIG. 4 is a block diagram illustrating the read-out peripheral region 130 described with reference to FIG. 1.

Referring to FIG. 4, the read-out peripheral region 130 includes an amplification control block 131 and an amplification block 133.

The amplification control block 131 generates a judge clock signal JDG_CLK and a precharge signal PCG in response to the clock signal COL_CLK. The amplification control block 131 includes a delay unit 131_1 for delaying the clock signal COL_CLK by a predetermined delay time to generate the judge clock signal JDG_CLK and a detection unit 131_3 for detecting a rising edge of the judge clock signal JDG_CLK and generating the precharge signal PCG that purses corresponding to the detected rising edge.

The amplification block 133 amplifies the differential output signals DOUTP and DOUTN loaded on the differential common lines to output as the single output signal DSIG in response to the judge clock signal JDG_CLK and the precharge signal PCG. The amplification block 133 includes a precharge unit 133_1 for precharging the differential common lines to a high voltage VDD level in response to the precharge signal PCG and an amplification unit 133_3 for amplifying a voltage difference between the differential output signals DOUTP and DOUTN loaded on the differential common lines to output the amplified differential output signals DOUTP and DOUTN as the single output signal DSIG in response to the judge clock signal JDG_CLK.

Hereinafter, an operation of the image sensing device 100 is described with reference to FIG. 5.

Figure 5:
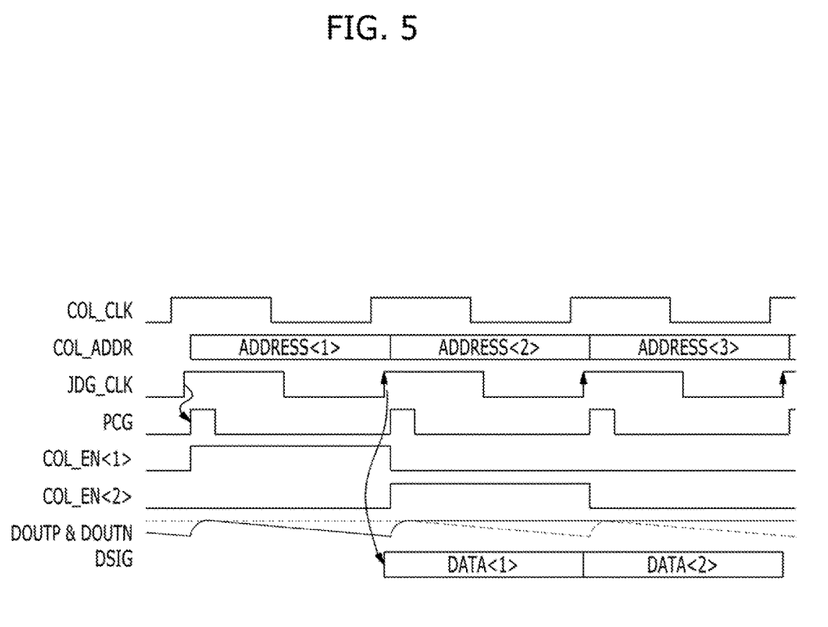
FIG. 5 is a timing diagram illustrating an operation of the image sensing device shown in FIG. 1.

FIG. 5 is a timing diagram illustrating the operation of the image sensing device 100 described with reference to FIG. 1.

Although not illustrated, the operation of the pixel region 110 is described below. The pixel region 110 generates the first to $N^{th}$ pixel signals V<1:N> every unit row time in response to the operation control signals ROW_CTRLs. The pixel region 110 generates the first to $N^{th}$ pixel signals V<1:N> from first to $N^{th}$ pixels arranged in a first row (not shown) during a first unit row time, and generates the first to $N^{th}$ pixel signals V<1:N> from the first to $N^{th}$ pixels arranged in a second row (not shown) during a second unit row time. In this way, the pixel region 110 sequentially generates the first to $N^{th}$ pixel signals V<1:N> from the first to $N^{th}$ pixels arranged in the first to the last row during each unit row time.

Referring to FIG. 5, the read-out core region 120 reads out the first to $N^{th}$ pixel signals V<1:N> in units of columns to sequentially output as the differential output signals DOUTP and DOUTN in response to the column address signal COL_ADDR. First to $N^{th}$ analog-to-digital conversion circuits ADC1 to ADCN convert the first to $N^{th}$ pixel signals V<1:N> into first to $N^{th}$ digital signals D<1:N>. The first to $N^{th}$ analog-to-digital conversion circuits ADC1 to ADCN detect voltage levels of the first to $N^{th}$ pixel signals V<1:N> based on a ramp voltage (not shown) that ramps by a predetermined voltage level, and generate the first to $N^{th}$ digital signals D<1:N> corresponding to the detection result.

First to $N^{th}$ differential circuits DIFF1 to DIFFN sequentially read out and load the first to $N^{th}$ digital signals D<1:N> on the differential common lines by columns as the differential output signals DOUTP and DOUTN in response to the column address signal COL_ADDR. The first differential circuit DIFF1 is activated in response to the column address signal COL_ADDR which is sampled during a section corresponding to a first cycle of the judge clock signal JDG_CLK, and outputs the first digital signal D<1> as the differential output signals DOUTP and DOUTN to the differential common lines. The second to $N^{th}$ differential circuits DIFF2 to DIFFN are deactivated in response to the column address signal COL_ADDR. The second differential circuit DIFF2 is activated in response to the column address signal COL_ADDR which is sampled during a section corresponding to a second cycle of the judge clock signal JDG_CLK, and outputs the second digital signal D<2> as the differential output signals DOUTP and DOUTN to the differential common lines The first differential circuit DIFF1 and the third to $N^{th}$ differential circuits DIFF3 to DIFFN are deactivated in response to the column address signal COL_ADDR. The $N^{th}$ differential circuit DIFFN is activated in response to the column address signal COL_ADDR which is sampled during a section corresponding to a $N^{th}$ cycle of the judge clock signal JDG_CLK and outputs the $N^{th}$ digital signal D<N> as the differential output signals DOUTP and DOUTN to the differential common lines. The first to $(N-1)^{th}$ differential circuits DIFF1 to DIFFN-1 are deactivated in response to the column address signal COL_ADDR. Hereinafter, operations of the first to $N^{th}$ differential circuits DIFF1 to DIFFN are described in detail. Since the operations of the first to $N^{th}$ differential circuits DIFF1 to DIFFN are the same, the operation of the first differential circuit DIFF1 is representatively described below.

The first latch block LAT1 latches the first digital signal D<1> and outputs the first differential latch signals LOUTP<1> and LOUTN<1> corresponding to the first digital signal D<1>. The first latch signal LOUTP<1> is outputted with a logic level corresponding to a non-inverted signal of the first digital signal D<1>, and the first inverted latch signal LOUTN<1> is outputted with a logic level corresponding to an inverted signal of the first digital signal D<1>.

Consequently, one of the first and second sinking transistors included in the first differential loading block SINK1 is turned on When the first latch signal LOUTP<1> is of a logic high level and the first inverted latch signal LOUTN<1> is of a logic low level, the first sinking transistor is turned on and sinks the first sink node SPN1 to a low voltage VSS level and the second sinking transistor is turned off and electrically decouples the first inverted sink node SNN1 from a low voltage VSS terminal. In contrast, when the first latch signal LOUTP<1> is of a logic low level and the first inverted latch signal LOUTN<1> is of a logic high level, the first sinking transistor is turned off and electrically decouples the first sink node SPN1 from the low voltage VSS terminal and the second sinking transistor is turned on and sinks the first inverted sink node SNN1 to the low voltage VSS level.

The first decoding block DEC1 enables the first enable signal COL_EN<1> in response to the column address signal COL_ADDR, and the first differential selection block SEL1 couples the non-inverted common line among the differential common lines with the first sink node SPN1 and couples the inverted common line among the differential common lines with the first inverted sink node SNN1 in response to the first enable signal COL_EN<>.

Consequently one of the differential common lines sinks to the low voltage VSS level. While the first sink node SPN1 is coupled with the low voltage VSS terminal, the non-inverted common line among the differential common lines sinks to the low voltage VSS level. In other words, a first sink path is formed between the non-inverted common line and the low voltage VSS terminal through the first coupling transistor and the first sinking transistor. Accordingly, the output signal DOUTP loaded on the non-inverted common line sinks from a high voltage VDD level to the low voltage VSS level. contrast while the first inverted sink node SNN1 is coupled with the low voltage VSS terminal, the inverted common line among the differential common lines sinks to the low voltage VSS level. In other words, a second sink path is formed between the inverted common line and the low voltage VSS terminal through the second coupling transistor and the second sinking transistor. Accordingly, the inverted output signal DOUTN loaded on the inverted common line sinks from the high voltage VDD level to the low voltage VSS level.

The read-out peripheral region 130 cyclically precharges the differential common lines to the high voltage VDD level, and sequentially reads out and amplifies the differential output signals DOUTP and DOUTN loaded on the differential common lines by columns to generate the single output signal DSIG in response to the clock signal COL_CLK.

For example, the delay unit 131_1 delays the clocks signal COL_CLK by a predetermined delay time to generate the judge clock signal JDG_CLK, and the detection unit 131_3 detects a rising edge of the judge dock signal JDG_CLK and generates the precharge signal PCG that purses corresponding to the rising edge of the judge clock signal JDG_CLK. Then, the precharge unit 133_1 precharges the differential common lines to the high voltage VDD level in response to the precharge signal PCG. The amplification unit 133_3 amplifies a voltage difference between the differential output signals DOUTP and DOUTN loaded on the differential common lines every rising edge of the judge dock signal JDG_CLK to output the amplified differential output signals DOUTP and DOUTN as the single output signal DSIG.

To sum up, the read-out peripheral region 130 precharges the differential common lines to the high voltage VDD level, corresponding to a first rising edge of the judge clock signal JDG_CLK. Therefore, the differential output signals DOUTP and DOUTN have the high voltage VDD level. The read-cut core region 120 sinks only one of the differential common lines to the low voltage VSS level based on the first pixel signal V<1> during the first cycle of the judge clock signal JDG_CLK. Therefore, one of the differential output signals DOUTP and DOUTN sinks from the high voltage VDD level to the low voltage VSS level while the other of the differential output signals DOUTP and DOUTN maintains the high voltage VDD level. The read-out peripheral region 130 amplifies the voltage difference between the differential output signals DOUTP and DOUTN loaded on the differential common lines corresponding to a second rising edge of the judge clock signal JDG_CLK to generate the single output signal DSIG, and then precharges the differential common lines to the high voltage VDD level again. Subsequently, when the read-out core region 120 and the read-out peripheral region 130 repeatedly carry out the aforementioned process for the second to $N^{th}$ pixel signals V<2:N>, the single output signal DSIG corresponding to the second to $N^{th}$ pixel signals V<2:N> is sequentially generated.

According to the comparative example described above, as the image sensing device 100 adopts a column-parallel read-out method, noise may be reduced, and operation speed may improve.

However, the following issue may occur in the image sensing device 100.

Referring back to FIG. 3, the first coupling transistor and the first sinking transistor are supposed to be turned on in order to sink the non-inverted common line among the differential common lines with the low voltage VSS, and the second coupling transistor and the second sinking transistor are supposed to be turned on in order to sink the inverted common line among the differential common lines with the low voltage VSS. Since the first coupling transistor and the first sinking transistor are coupled with in series, a first combined resistance component, which is combination of a resistance component of the first coupling transistor and a resistance component of the first sinking transistor, is reflected in the first sink path formed between the non-inverted common line among the differential common lines and the low voltage VSS terminal. Also, since the second coupling transistor and the second sinking transistor are coupled in series, a second combined resistance component, which is combination of a resistance component of the second coupling transistor and a resistance component of the second sinking transistor, is reflected in the second sink path formed between the inverted common line among the differential common lines and the low voltage VSS terminal.

Accordingly, since the output signal DOUTP does not sufficiently sink to the low voltage VSS level due to the first combined resistance component, and the inverted output signal DOUTN does not sufficiently sink to the low voltage VSS level due to the second combined resistance component, there is a problem in that the voltage difference between the differential output signals DOUTP and DOUTN is not sufficiently secured. In other words, as the differential voltage swing margin decreases when the image sensing device 100 performs a read-out operation, noise immunity also decreases.

For this reason, an embodiment of the present invention provides an image sensing device with an improved differential voltage swing margin.

Figure 6:
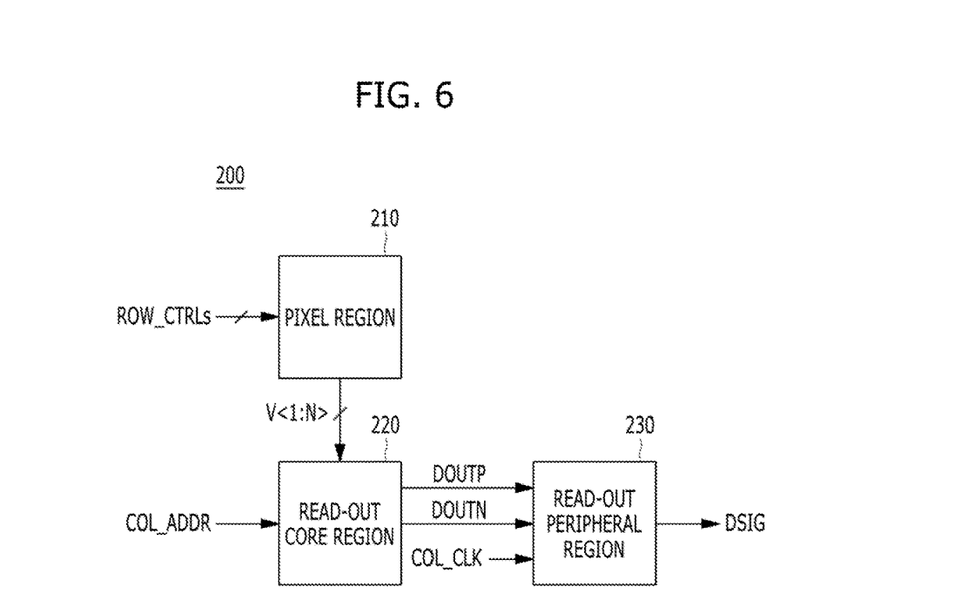
FIG. 6 is a block diagram illustrating an image sensing device in accordance with an embodiment of the present invention.

FIG. 6 is a block diagram illustrating an image sensing device 200 in accordance with an embodiment of the present invention.

Referring to FIG. 6, the image sensing device 200 may include a pixel region 210, a read-out core region 220, and a read-out peripheral region 230.

The pixel region 21 may include a pixel array where a plurality of pixels are arranged in a row and a column direction (not shown). The pixel region 210 may generate first to $N^{th}$ pixel signals V<1:N> in units of rows in response to operation control signals ROW_CTRLs. The pixel region 210 may be the same as the pixel region 110 included in the image sensing device 100.

The read-out core region 220 may read out and sequentially output the first to $N^{th}$ pixel signals V<1:N> by columns to sequentially output as differential output signals DOUTP and DOUTN in response to a column address signal COL_ADDR.

The read-out peripheral region 230 may output the differential output signals DOUTP and DOUTN as a single output signal DSIG in response to a dock signal COL_CLK. The read-out peripheral region 230 may be the same as the read-out peripheral region 130 included in the image sensing device 100.

Figure 7:
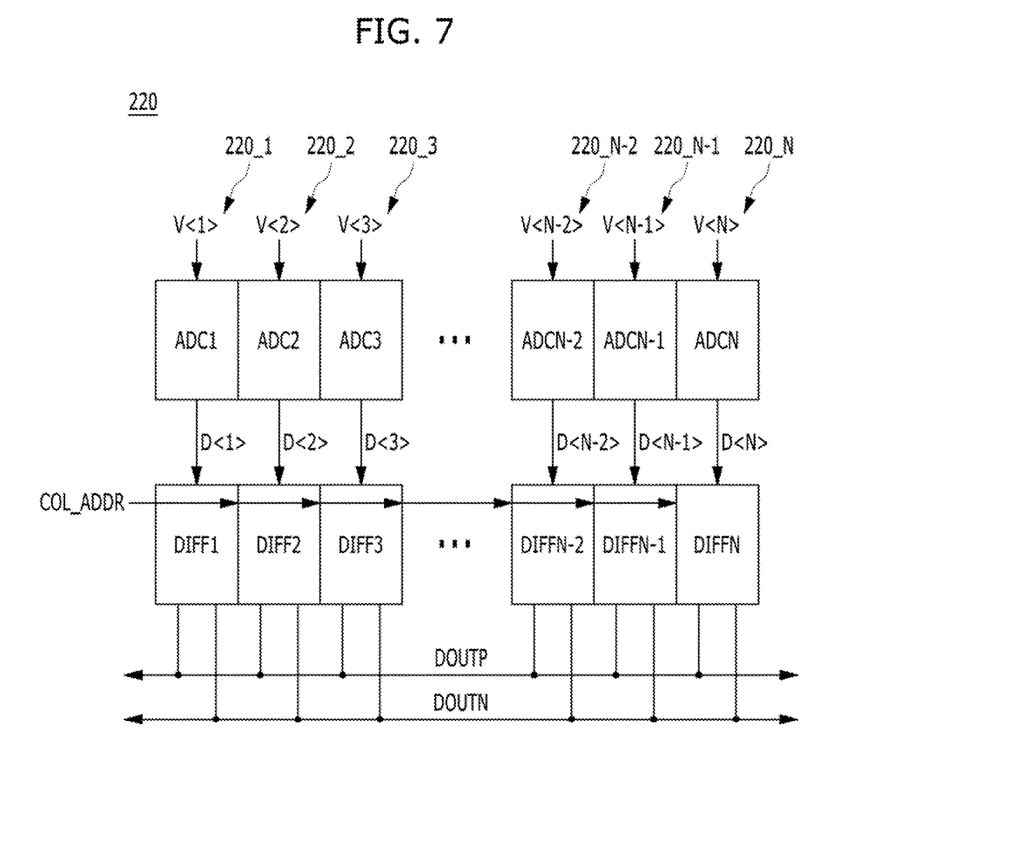
FIG. 7 is a circuit diagram illustrating a read-out core region shown in FIG. 6.

FIG. 7 is a circuit diagram illustrating the read-out core region 220 described with reference to FIG. 6.

Referring to FIG. 7 the read-out core region 220 may include first to $N^{th}$ read-out blocks 220_1 to 220_N corresponding to the first to $N^{th}$ pixel signals V<1:N>. Since the first to $N^{th}$ read-out blocks 220_1 to 220_N have the same structure, the first read-out block 220_1 is representatively described.

The first read-out block 220_1 may include a first analog-to-digital conversion circuit. ADC1 and a first differential circuit DIFF1.

The first analog-to-digital conversion circuit ADC1 may convert the first pixel signal V<1>, which is an analog signal, into a digital signal D<1>. For example, although not illustrated, the first analog-to-digital conversion circuit ADC1 may detect a voltage level of the first pixel signal V<1> on a basis of a ramp voltage which changes by a predetermined voltage level, and generate the digital signal D<1> corresponding to the detection result. The first analog-to-digital conversion circuit ADC1 may be the same as the first analog-to-digital conversion circuit ADC1 included in the image sensing device 100.

The first differential circuit DIFF1 may output the differential output signals DOUTP and DOUTN corresponding to the first digital signal D<1> to differential common lines in response to the column address signal COL_ADDR.

Figure 8:
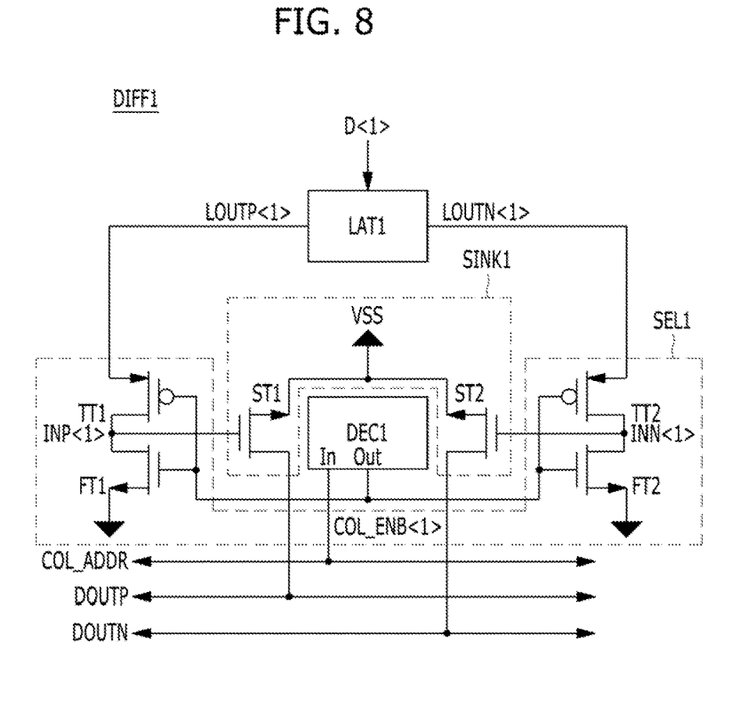
FIG. 8 is a circuit diagram illustrating a first differential circuit shown in FIG. 7.

FIG. 8 is a circuit diagram illustrating the first differential circuit DIFF1 described with reference to FIG. 7.

Referring to FIG. 8, the first differential circuit DIFF1 may include a first latch block LAT1, a first decoding block DEC1, a first differential selection block SEL1, and a first differential loading block SINK1.

The first latch block LAT1 may latch the first digital signal D<1> corresponding to the first pixel signal V<1> and output first differential latch signals LOUTP<1> and LOUTN<1> corresponding to the first digital signal D<1>. The first latch block LAT1 may output a non-inverted signal of the first digital signal D<1> as the first latch signal LOUTP<1>, and output an inverted signal of the first digital signal D<1> as the first inverted latch signal LOUTN<1>. The first latch block LAT1 may be the same as the first latch block LAT1 included in the image sensing device 100.

The first decoding block DEC1 may generate a first enable signal COL_ENB<1> in response to the column address signal COL_ADDR For example, the first decoding block DEL1 may decode the column address signal COL_ADDR and enable or disable the first enable signal COL_ENB<1> based on the decoding result. The first decoding block DEC1 may be the same as the first decoding block DEC1 included in the image sensing device 100 except that the first decoding block DEC1 in accordance with the embodiment of the present invention may the first enable signal COL_ENB<1> to a logic low level.

The first differential selection block SEL1 may generate first differential selection signals INP<1> and INN<1> corresponding to the first differential latch signals LOUTP<1> and LOUTN<1> in response to the first enable signal COL_ENB<1>. The first differential selection block SEL1 may include first selection unit TT1 and FT1 for generating the first selection signal INP<1> corresponding to the first latch signal LOUTP<1> in response to the first enable signal COL_ENB<1> and first inverted selection unit TT2 and FT2 for generating the first inverted selection signal INN<1> corresponding to the first inverted latch signal LOUTN<1> in response to the first enable signal COL_ENB<1>.

The first selection unit TT1 and FT1 may include a first transmission transistor TT1 for transmitting the first latch signal LOUTP<1> to a first output node of the first selection unit TT1 and FT1 in response to the first enable signal COL_ENB<1> and a first fixed transistor FT1 for fixing the first output node of the first selection unit TT1 and FT1 with a low voltage VSS level in response to the first enable signal COL_ENB<1>. The first selection unit TT1 and FT1 may output the first selection signal INP<1> at the first output node. When the first enable signal COL_ENB<1> is enabled to a logic low level, the first transmission transistor TT1 may be turned on and output the first selection signal INP<1> corresponding to the first latch signal LOUTP<1> to the first output node. When the first enable signal COL_ENB<1> is disabled to a logic high level, the first transmission transistor TT1 may be turned off and electrically decouple a first input node of the first selection unit TT1 and FT1, to which the first latch signal LOUTP<1> is inputted, from the first output node. When the first enable signal COL_ENB<1> is enabled to the logic low level, the first fixed transistor FT1 may be turned on and drive the first output node with the low voltage VSS level. When the first enable signal COL_ENB<1> is disabled to the logic high level, the first fixed transistor FT1 may be turned off and electrically decouple a low voltage VSS terminal from the first output node.

The first inverted selection unit TT2 and FT2 may include a second transmission transistor TT2 for transmitting the first inverted latch signal LOUTN<1> to a second output node of the first inverted selection unit TT2 and FT2 in response to the first enable signal COL_ENB<1> and a second fixed transistor FT2 for fixing the second output node of the first inverted selection unit TT2 and FT2 with a low voltage VSS level in response to the first enable signal COL_ENB<1>. The first inverted selection unit TT2 and FT2 may output the first inverted selection signal INN<1> at the second output node. When the first enable signal COL_ENB<1> is enabled to a logic low level, the second transmission transistor TT2 may be turned on and output the first inverted selection signal INN<1> corresponding to the first inverted latch signal LOUTN<1> to the second output node. When the first enable signal COL_ENB<1> is disabled to a logic high level, the second transmission transistor TT2 may be turned off and electrically decouple a second input node of the first inverted selection unit TT2 and FT2, to which the first inverted latch signal LOUTN<1> is inputted, from the second output node. When the first enable signal COL_ENB<1> is disabled to the logic high level the second fixed transistor FT2 may be turned on and drive the second output node with the low voltage VSS level. When the first enable signal COL_ENB<1> is disabled to the logic high level, the second fixed transistor FT2 may be turned off and electrically decouple the low voltage VSS terminal from the second output node.

The first differential loading block SINK1 may output the differential output signals DOUTP and DOUTN corresponding to the first differential latch signals LOUTP<1> and LOUTN<1> to the differentia common lines in response to the first differential selection signals INP<1> and INN<1>. The first differential loading block SINK1 may include a first sinking transistor ST1 for sinking the nonce inverted common line among the differential common lines to the low voltage VSS level in response to the first selection signal INP<1>, and a second sinking transistor ST2 for sinking the inverted common line among the differential common lines to the low voltage VSS level in response to the first inverted selection signal INN<1>. The differential common lines may be precharged with a high voltage VDD by the read-out peripheral region 230, which is to be described below.

Figure 9:
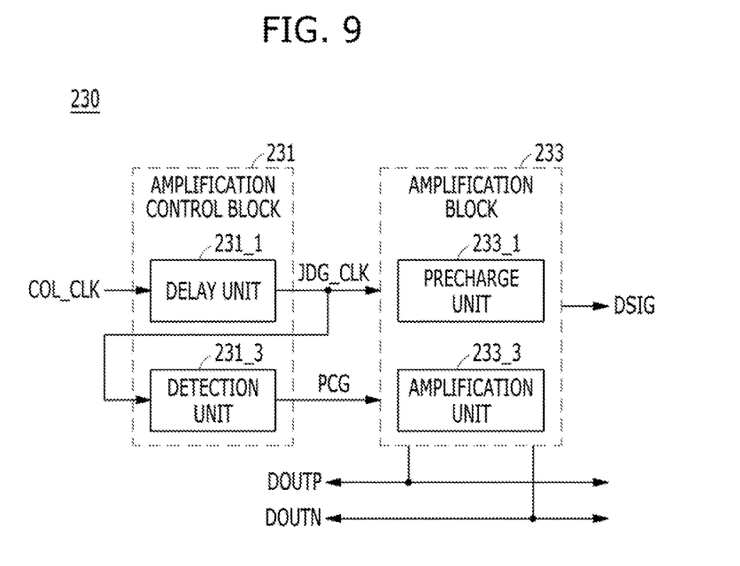
FIG. 9 is a block diagram illustrating a read-out peripheral region shown in FIG. 6.

FIG. 9 is a block diagram illustrating the read-out peripheral region 230 described with reference to FIG. 6.

Referring to FIG. 9, the read-out peripheral region 230 may include an amplification control block 231 and an amplification block 233.

The amplification control block 231 may generate a judge clock signal JDG_CLK and a precharge signal PCG in response to the dock signal COL_CLK. The amplification control block 231 includes a delay unit 231_1 for delaying the dock signal COL_CLK by a predetermined delay time to generate the judge clock signal JDG_CLK and a detection unit 231_3 for detecting a rising edge of the judge clock signal JDG_CLK and generating the precharge signal PCG that purses corresponding to the detected rising edge. The amplification control block 231 may be the same as the amplification control block 131 included in the image sensing device 100.

The amplification block 233 may amplify the differential output signals DOUTP and DOUTN loaded on the differential common lines to output as the single output signal DSIG in response to the judge clock signal JDG_CLK and the precharge signal PCG. For example, the amplification block 233 may include a precharge unit 233_1 for precharging the differential common lines to a high voltage VDD level in response to the precharge signal PCG and an amplification unit 233_3 for amplifying a voltage difference between the differential output signals DOUTP and DOUTN loaded on the differential common lines to output the amplified differential output signals DOUTP and DOUTN as the single output signal DSIG in response to the judge dock signal JDG_CLK. The amplification block 233 may be the same as the amplification block 133 included in the image sensing device 100.

Hereinafter, an operation of the image sensing device 200 is described with reference to FIGS. 10 and 11.

Figure 10:
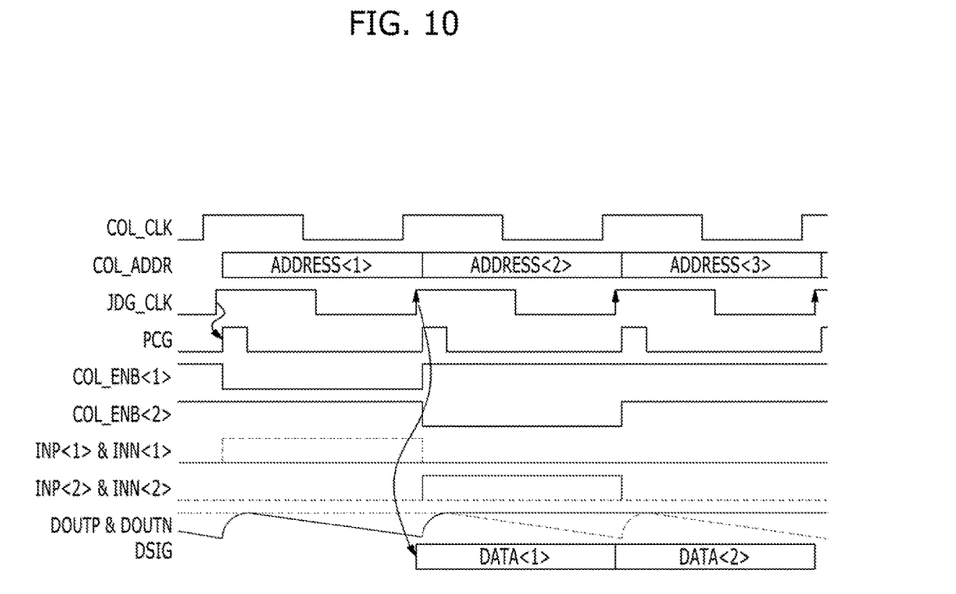
FIG. 10 is a timing diagram illustrating an operation of the image sensing device shown in FIG. 6.

FIG. 10 is a timing diagram illustrating the operation of the image sensing device 200 described with reference to FIG. 6. FIG. 11 is a simulation diagram illustrating the differential output signals DOUTP and DOUTN described with reference to FIGS. 5 and 10.

Although not illustrated, the operation of the pixel region 110 is described below. The pixel region 110 generates the first to $N^{th}$ pixel signals V<1:N> every unit row time in response to the operation control signals ROW_CTRLs. The pixel region 110 generates the first to $N^{th}$ pixel signals V<1:N> from first to $N^{th}$ pixels arranged in a first row (not shown) during a first unit row time, and generates the first to $N^{th}$ pixel signals V<1:N> from the first to $N^{th}$ pixels arranged in a second row (not shown) during a second unit row time. In this way, the pixel region 110 sequentially generates the first to $N^{th}$ pixel signals V<1:N> from the first to $N^{th}$ pixels arranged in the first to the last row during each unit row time.

Referring to FIG. 10, the read-out core region 220 may read out the first to $N^{th}$ pixel signals V<1:N> by columns to sequentially output as the differential output signals DOUTP and DOUTN in response to the column address signal COL_ADDR. A detailed description thereon is as follows.

First to $N^{th}$ analog-to-digital conversion circuits ADC1 to ADCN may convert the first to $N^{th}$ pixel signals V<1:N> into first to $N^{th}$ digital signals D<1:N>. The first to $N^{th}$ analog-to-digital conversion circuits ADC1 to ADCN may detect voltage levels of the first to $N^{th}$ pixel signals V<1:N> based on a ramp voltage (not shown) that ramps by a predetermined voltage level, and generate the first to $N^{th}$ digital signals D<1:N> corresponding to the detection result.

First to $N^{th}$ differential circuits DIFF1 to DIFFN may sequentially read out and output the first to $N^{th}$ digital signals D<1:N> to the differential common lines by columns as the differential output signals DOUTP and DOUTN in response to, the column address signal COL_ADDR. The first differential circuit DIFF1 may be activated in response to the column address signal COL_ADDR which is sampled during a section corresponding to a first cycle of the judge clock signal JDG_CLK, and output the first digital signal D<1> as the differential output signals DOUTP and DOUTN to the differential common lines. The second to $N^{th}$ differential circuits DIFF2 to DIFFN may be deactivated in response to the column address signal COL_ADDR. The second differential circuit DIFF2 may be activated in response to the column address signal COL_ADDR which is sampled during a section corresponding to a second cycle of the judge clock signal JDG_CLK, and output the second digital signal D<2> as the differential output signals DOUTP and DOUTN to the differential common lines. The first differential circuit DIFF1 and the third to $N^{th}$ differential circuits DIFF3 to DIFFN may be deactivated in response to the column address signal COL_ADDR. The $N^{th}$ differential circuit DIFFN may be activated in response to the column address signal COL_ADDR which is sampled during a section corresponding to a $N^{th}$ cycle of the judge clock signal JDG_CLK, and output the $N^{th}$ digital signal D<N> as the differential output signals DOUTP and DOUTN to the differential common lines. The first to $(N-1)^{th}$ differential circuits DIFF1 to DIFFN−1 may be deactivated in response to the column address signal COL_ADDR. Hereinafter, operations of the first to $N^{th}$ differential circuits DIFF1 to DIFFN are described in detail. Since the operations of the first to $N^{th}$ differential circuits DIFF1 to DIFFN are the same, the operation of the first differential circuit DIFF1 is representatively described below.

The first latch block LAT1 may latch the first digital signal D<1> and output the first differential latch signals LOUTP<1> and LOUTN<1> corresponding to the first digital signal D<1>. The first latch block LAT1 may output the first latch signal LOUTP<1> with a logic level corresponding to a non-inverted signal of the first digital signal D<1> and may output the first inverted latch signal LOUTN<1> with a logic level corresponding to an inverted signal of the first digital signal D<1>.

When the first digital signal D<1> has a logic high level, the first latch block LAT1 may output the first latch signal LOUTP<1> having a logic high level and may output the first inverted latch signal LOUTN<1> having a logic low level. In contrast, when the first digital signal D<1> has a logic low level, the first latch block LAT1 may output the first latch signal LOUTP<1> having a logic low level and may output the first inverted latch signal LOUTN<1> having a logic high level.

The first decoding block DEC1 may generate the first enable signal COL_ENB<1> in response to the column address signal COL_ADDR. The first decoding block DEC1 may enable the first enable signal COL_ENB<1> to a logic low level during a section corresponding to a first cycle of the judge clock signal JDG_CLK, and may disable the first enable signal COL_ENB<1> to a logic high level during a section corresponding to another cycle of the judge clock signal JDG_CLK.

Then, the first differential selection block SEL1 may generate the first differential selection signals INP<1> and INN<1> corresponding to the first differential latch signals LOUTP<1> and LOUTN<1> in response to the first enable signal COL_ENB<1>.

When the first enable signal COL_ENB<1> is enabled the first selection unit TT1 and FT1 and the first inverted selection unit TT2 and FT2 included in the first differential selection block SEL1 may be activated. The first selection unit TT1 and FT1 may generate the first selection signal INP<1> corresponding to a logic level of the first latch signal LOUTP<1>, and the first inverted selection unit TT2 and FT2 may generate the first inverted selection signal INN<1> corresponding to a logic level of the first inverted latch signal LOUTN<1>, The first selection unit TT1 and FT1 may generate the first selection signal INP<1> having a logic high level corresponding to the first latch signal LOUTP<1> having a logic high level, and the first inverted selection unit TT2 and FT2 may generate the first inverted selection signal INN<1> having a logic low level corresponding to the first inverted latch signal LOUTN<1> having a logic low level. Further, the first selection unit TT1 and FT1 may generate the first selection signal INP<1> having a logic low level corresponding to the first latch signal LOUTP<1> having a logic low level, and the first inverted selection unit TT2 and FT2 may generate the first inverted selection signal INN<1> having a logic high level corresponding to the first inverted latch signal LOUTN<1> having a logic high level.

When the first enable signal COL_ENB<1> is disabled, the first selection unit TT1 and FT1 and the first inverted selection unit TT2 and FT2 included in the first differential selection block SEL1 may be deactivated. The first selection unit TT1 and FT1 may generate the first selection signal INP<1> fixed with a logic low level regardless of the first latch signal LOUTP<1>, and the first inverted selection unit TT2 and FT2 may generate the first inverted selection signal INN<1> fixed with a logic low level regardless of he first inverted latch signal LOUTN<1>.

Continuously, the first differential loading block SINK1 may sink one of the differential common lines to the low voltage VSS level or electrically decouple between the differential common lines and the low voltage VSS terminal in response to the first selection signal INP<1>.

When the first selection signal INP<1> has a logic high level, and the first inverted selection signal INN<1> has a logic low level, the first differential loading block SINK1 may electrically couple the non-inverted common line among the differential common lines with the low voltage VSS terminal and may electrically decouple the inverted common line among the differential common lines from the low voltage VSS terminal. A first sink path may be formed between the non-inverted common line and the low voltage VSS terminal through the first sinking transistor ST1.

In contrast, when the first selection signal INP<1> has a logic low level, and the first inverted selection signal INN<1> has a logic high level, the first differential loading block SINK1 may electrically decouple the non-inverted common line among the differential common lines from the low voltage VSS terminal and may electrically couple the inverted common line among the differential common lines with the low voltage VSS terminal. A second sink path may be formed between the non-inverted common line and the low voltage VSS terminal through the second sinking transistor ST2.

Figure 11:
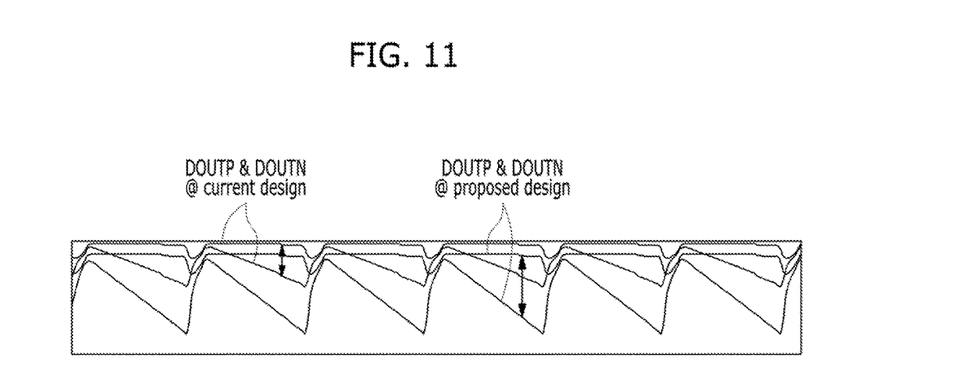
FIG. 11 is a simulation diagram illustrating a differential output signal shown in FIG. 10.

Therefore, since a resistance component corresponding to a single transistor is reflected in the first and second sink paths a differential voltage swing margin may be improved two times as compared with the comparative example, as illustrated in FIG. 11.

When the first differential selection signals INP<1> and INN<1> have the logic low levels, the first differential loading block SINK1 may decouple the differential common lines from the low voltage VSS terminal. This is an example where the first differential circuit DIFF1 is not selected to electrically decouple the first latch block LAT1 from the differential common lines.

The read-out peripheral region 230 may cyclically precharge the differential common lines to the high voltage VDD level, and sequentially read out and amplify the differential output signals DOUTP and DOUTN loaded on the differential common lines by columns to generate the single output signal DSIG in response to the clock signal COL_CLK.

For example, the delay unit 231_1 may delay the clock signal COL_CLK by a predetermined delay time to generate the judge clock signal JDG_CLK, and the detection unit 231_3 may detect a rising edge of the judge clock signal JDG_CLK and generate the precharge signal PCG that purses corresponding to the rising edge of the judge clock signal JDG_CLK. Then, the precharge unit 233_1 may precharge the differential common lines to the high voltage VDD level in response to the precharge signal PCG. The amplification unit 233_3 may amplify a voltage difference between the differential output signals DOUTP and DOUTN loaded on the differential common lines every rising edge of the judge clock signal JDG_CLK to output the amplified differential output signals DOUTP and DOUTN as the single output signal DSIG.

To sum up, the read-out peripheral region 230 may precharge the differential common lines to the high voltage VDD level, corresponding to a first rising edge of the judge dock signal JDG_CLK. Therefore, the differential output signals DOUTP and DOUTN may have the high voltage VDD level. The readout core region 220 may sink only one of the differential common lines to the low voltage VSS level based on the first pixel signal V<1> during the first cycle of the judge clock signal JDG_CLK. Therefore, one of the differential output signals DOUTP and DOUTN may sink from the high voltage VDD level to the low voltage VSS level while the other of the differential output signals DOUTP and DOUTN may maintain the high voltage VDD level. Since a smaller resistance component as compared with the comparative example is reflected in the first or second sink path, the differential voltage swing margin between the differential output signals DOUTP and DOUTN may be improved. The read-out peripheral region 230 may amplify the voltage difference between the differential output signals DOUTP and DOUTN loaded on the differential common lines corresponding to a second rising edge of the judge dock signal JDG_CLK to generate the single output signal DSIG, and then precharge the differential common lines to the high voltage VDD level again. Subsequently, when the read-out core region 220 and the read-out peripheral region 230 repeatedly carry out the aforementioned process for the second to $N^{th}$ pixel signals V<2:N>, the single output signal DSIG corresponding to the second to $N^{th}$ pixel signals V<2:N> may be sequentially generated.

In accordance with the embodiment of the present invention, a voltage difference between differential output signals may be sufficiently amplified and noise immunity may be improved as a differential voltage swing margin between the differential output signals is improved.

While the present invention has been described with respect to specific embodiments, the embodiments are not intended to be restrictive, but rather descriptive. Further, it is noted that the present invention may be achieved in various ways through substitution, change, and modification, by those skilled in the art without departing from the scope of the present invention as defined by the following claims.

Although an image sensing device is described in the embodiments of the present invention, the inventive concept is not limited to this, and the present invention may be applicable to other devices and circuits including differential circuits.

What is claimed is:

1. A differential circuit, comprising:
    a differential selection circuit configured to generate differential selection signals corresponding to differential input signals in response to an enable signal; and
    a differential loading circuit configured to load differential output signals corresponding to the differential input signals on differential lines in response to the differential selection signals,
    wherein the differential loading circuit includes:
        a first loading circuit including a first sinking transistor configured to load a first output signal among the differential output signals on a first line among the differential lines in response to a first selection signal among the differential selection signals; and
        a second loading circuit including a second sinking transistor configured to load a second output signal among the differential output signals on a second line among the differential lines in response to a second selection signal among the differential selection signals,
    wherein a first terminal of the first sinking transistor is directly coupled to a ground voltage terminal, a second terminal of the first sinking transistor is coupled to a first output node of the first line among the different lines, a first terminal of the second sinking transistor is directly coupled to the ground voltage terminal, a second terminal of the second sinking transistor is coupled to a second output node of the second line among the differential lines, and each of the first sinking transistor and the second sinking transistor sinks the differential lines to a ground voltage level in response to the differential selection signals.

2. The differential circuit of claim 1, wherein the differential selection circuit includes:
    a first selection circuit configured to generate a first selection signal among the differential selection signals in response to the enable signal and a first input signal among the differential input signals; and
    a second selection circuit configured to generate a second selection signal among the differential selection signals in response to the enable signal and a second input signal among the differential input signals.

3. The differential circuit of claim 2, wherein the first selection circuit generates the first selection signal having a voltage level corresponding to a voltage level of the first input signal or fixed with a predetermined voltage level regardless of the voltage level of the first input signal in response to the enable signal.

4. The differential circuit of claim 2, wherein the second selection circuit generates the second selection signal having a voltage level corresponding to a voltage level of the second input signal or fixed with a predetermined voltage level regardless of the voltage level of the second input signal in response to the enable signal.

5. The differential circuit of claim 1, wherein the first loading circuit selectively outputs the first output signal having a predetermined voltage level to the first line in response to the first selection signal.

6. The differential circuit of claim 1, wherein the second loading circuit selectively outputs the second output signal having a predetermined voltage level to the second line in response to the second selection signal.

7. The differential circuit of claim 1,
further comprising a precharge circuit configured to precharge the differential lines to a high voltage level,
wherein the differential loading circuit sinks one of the differential lines to a low voltage level.

8. A differential circuit, comprising:
a first transmission transistor configured to transmit a first latch signal among differential latch signals to a first output node in response to an enable signal;
a first fixed transistor configured to receive the enable signal, and fix the first output node with a low voltage level in response to the enable signal;
a first sinking transistor directly coupled to a low voltage terminal and configured to sink a first line precharged with a high voltage among differential lines to the low voltage level in response to a first selection signal generated through the first output node among differential selection signals;
a second transmission transistor configured to transmit a second latch signal among the differential latch signals to a second output node in response to the enable signal;
a second fixed transistor configured to fix the second output node with the low voltage level in response to the enable signal; and
a second sinking transistor directly coupled to the low voltage terminal and configured to sink a second line among the differential lines to the low voltage level in response to a second selection signal generated through the second output node among the differential selection signals,
wherein the first selection signal and the second selection signal are complementary signals to each other.

9. An image sensing device, comprising:
a plurality of decoding circuits configured to sequentially generate a plurality of enable signals in response to a column address signal;
a plurality of latch circuits configured to latch digital signals corresponding to a plurality of pixel signals, and output a plurality of differential latch signals corresponding to the latched digital signals;
a plurality of first selection circuits configured to receive the enable signals and the plurality of differential latch signals, and sequentially generate a plurality of first selection signals among a plurality of differential selection signals in response to the enable signals and a plurality of first latch signals among the differential latch signals;
a plurality of second selection circuits configured to receive the enable signals and the plurality of differential latch signals, and sequentially generate a plurality of second selection signals among the differential selection signals in response to the enable signals and a plurality of second latch signals among the differential latch signals;
a plurality of first loading circuits directly coupled to a low voltage terminal and configured to sink a first common line precharged with a high voltage among differential common lines to a low voltage level and to receive the first selection signals, and sequentially load a plurality of first output signals among a plurality of differential output signals corresponding to the differential latch signals on the first common line among the differential common lines in response to the first selection signals; and
a plurality of second loading circuits directly coupled to the low voltage terminal and configured to receive the second selection signals, and sequentially load a plurality of second output signals among the differential output signals on a second common line among the differential common lines in response to the second selection signals,
wherein the plurality of first output signals are complementary to the plurality of second output signals, respectively.

10. The image sensing device of claim 9,
wherein an activated first selection circuit among the first selection circuits generates a corresponding first selection signal among the first selection signals based on a voltage level of a corresponding first latch signal among the first latch signals,
wherein a deactivated first selection circuit among the first selection circuits fixes another first selection signal among the first selection signals with a predetermined voltage level regardless of a voltage level of another first latch signal among the first latch signals,
wherein an activated second selection circuit among the second selection circuits generates a corresponding second selection signal among the second selection signals based on a voltage level of a corresponding second latch signal among the second latch signals, and
wherein a deactivated second selection circuit among the second selection circuits fixes another second selection signal among the second selection signals with a predetermined voltage level regardless of a voltage level of another second latch signal among the second latch signals.

11. The image sensing device of claim 10, wherein a selected first loading circuit among the first loading circuits outputs a corresponding first output signal among the first output signals to the first common line based on a voltage level of the corresponding first selection signal,
wherein a non-selected first loading circuit among the first loading circuits is deactivated in response to the another first selection signal,
wherein a selected second loading circuit among the second loading circuits outputs a corresponding second output signal among the second output signals to the second common line based on a voltage level of the corresponding second selection signal, and
wherein a non-selected second loading circuit among the second loading circuits is deactivated in response to the another second selection signal.

12. The image sensing device of claim 11,
further comprising: a precharge circuit configured to precharge the differential common lines to a high voltage level,
wherein one of the selected first loading circuit and the selected second loading circuit sinks one of the first common line and the second common line among the differential common lines to the low voltage level.

13. The image sensing device of claim 9, wherein each of the first selection circuits includes:
a first transmission transistor configured to transmit a first latch signal to a first output node in response to the enable signal; and
a first fixed transistor configured to fix the first output node with the low voltage level in response to the enable signal.

14. The image sensing device of claim 13, wherein each of the first loading circuits includes a sinking transistor for sinking the first common line to the low voltage level in response to a first selection signal generated through the first output node.

15. The image sensing device of claim 9, wherein each of the second selection circuits includes:
a second transmission transistor configured to transmit a second latch signal to a second output node in response to the enable signal; and
a second fixed transistor configured to fix the second output node with the low voltage level in response to the enable signal.

16. The image sensing device of claim 15, wherein each of the second loading circuits includes a second sinking transistor for sinking the second common line to the low voltage level in response to a second selection signal generated through the second output node.

17. The image sensing device of claim 9, further comprising:
a pixel region configured to generate the pixel signals; and
a read-out peripheral region configured to output the differential output signals sequentially transmitted through the differential common lines as a plurality of single output signals.

18. The image sensing device of claim 17, wherein the read-out peripheral region includes:
an amplification control circuit configured to generate a judge clock signal by delaying a clock signal by a predetermined delay time, and generate a precharge signal that purses every predetermined edge of the judge clock signal; and
an amplification circuit configured to sequentially generate the single output signals by sequentially amplifying the differential output signals in response to the judge clock signal and the precharge signal.

19. The image sensing device of claim 18, wherein the amplification circuit includes
a precharge circuit configured to cyclically precharge the differential common lines with the high voltage in response to the precharge signal,
wherein the amplification circuit configured to sequentially amplify the differential output signals sequentially loaded on the differential common lines in response to the judge clock signal.

20. An image sensing device, comprising:
a plurality of decoding circuits configured to sequentially generate a plurality of enable signals in response to a column address signal;
a plurality of latch circuits configured to latch digital signals corresponding to a plurality of pixel signals, and output a plurality of differential latch signals corresponding to the latched digital signals;
a plurality of first selection circuits configured to receive the enable signals and the plurality of differential latch signals, and sequentially generate a plurality of first selection signals among a plurality of differential selection signals in response to the enable signals and a plurality of first latch signals among the differential latch signals;
a plurality of second selection circuits configured to receive the enable signals and the plurality of differential latch signals, and sequentially generate a plurality of second selection signals among the differential selection signals in response to the enable signals and a plurality of second latch signals among the differential latch signals;
a plurality of first loading circuits coupled to a low voltage terminal and configured to receive the first selection signals, and sequentially load a plurality of first output signals among a plurality of differential output signals corresponding to the differential latch signals on a first common line among differential common lines in response to the first selection signals;
a plurality of second loading circuits configured to receive the second selection signals, and sequentially load a plurality of second output signals among the differential output signals on a second common line among the differential common lines in response to the second selection signals;
a pixel region configured to generate the pixel signals; and
a read-out peripheral region configured to output the differential output signals sequentially transmitted through the differential common lines as a plurality of single output signals,
wherein the plurality of first output signals are complementary to the plurality of second output signals, respectively, and
wherein the read-out peripheral region includes:
an amplification control circuit configured to generate a judge clock signal by delaying a clock signal by a predetermined delay time, and generate a precharge signal that purses every predetermined edge of the judge clock signal; and
an amplification circuit configured to sequentially generate the single output signals by sequentially amplifying the differential output signals in response to the judge clock signal and the precharge signal.

* * * * *